United States Patent
Yun et al.

(10) Patent No.: US 12,131,868 B2
(45) Date of Patent: Oct. 29, 2024

(54) MULTI-LAYER CERAMIC ELECTRONIC COMPONENT

(71) Applicant: SAMSUNG ELECTRO-MECHANICS CO., LTD., Suwon-si (KR)

(72) Inventors: Hyung Duk Yun, Suwon-si (KR); Ga Young An, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 52 days.

(21) Appl. No.: 17/536,710

(22) Filed: Nov. 29, 2021

(65) Prior Publication Data
US 2022/0208473 A1    Jun. 30, 2022

(30) Foreign Application Priority Data
Dec. 31, 2020 (KR) .................. 10-2020-0189098

(51) Int. Cl.
*H01G 4/30* (2006.01)
*H01G 4/008* (2006.01)
*H01G 4/232* (2006.01)
*H01G 4/248* (2006.01)

(52) U.S. Cl.
CPC .............. *H01G 4/30* (2013.01); *H01G 4/008* (2013.01); *H01G 4/232* (2013.01); *H01G 4/248* (2013.01)

(58) Field of Classification Search
CPC .......... H01G 4/30; H01G 4/008; H01G 4/232; H01G 4/248
USPC ............. 361/301.4, 321.1, 321.3, 306.3
See application file for complete search history.

(56) References Cited

U.S. PATENT DOCUMENTS

| | | | |
|---|---|---|---|
| 2007/0242416 A1* | 10/2007 | Saito | H01G 4/2325 361/321.1 |
| 2011/0128665 A1* | 6/2011 | Nies | H01G 4/1227 361/305 |
| 2014/0151101 A1* | 6/2014 | Lee | H01G 4/12 156/89.12 |
| 2016/0212850 A1* | 7/2016 | Kainuma | H10N 30/877 |
| 2017/0103853 A1* | 4/2017 | Zenzai | H01G 4/232 |
| 2017/0309402 A1* | 10/2017 | Yamashita | H01F 27/292 |

(Continued)

FOREIGN PATENT DOCUMENTS

| | | |
|---|---|---|
| JP | 2003-109838 A | 4/2003 |
| JP | 2012-033621 A | 2/2012 |
| JP | 2020-88190 A | 6/2020 |

*Primary Examiner* — Arun Ramaswamy
(74) *Attorney, Agent, or Firm* — Morgan, Lewis & Bockius LLP (57) ABSTRACT

A multilayer ceramic electronic component includes: a ceramic body including a dielectric layer and first and second internal electrodes disposed to be alternately stacked with the dielectric layer interposed therebetween; a first external electrode; and a second external electrode. The first external electrode includes a first electrode layer disposed to be in contact with the ceramic body, and a first conductive layer disposed on the first electrode layer. The second external electrode includes a second electrode layer disposed to be in contact with the ceramic body, and a second conductive layer disposed on the second electrode layer. The first conductive layer and the second conductive layer are plating layers. The first conductive layer and the second conductive layer are porous.

26 Claims, 5 Drawing Sheets

(56) References Cited

U.S. PATENT DOCUMENTS

| | | | | |
|---|---|---|---|---|
| 2018/0166215 A1* | 6/2018 | Hamanaka | ............... | H01G 4/12 |
| 2019/0096577 A1* | 3/2019 | Uenishi | .................. | H01G 4/232 |
| 2019/0318874 A1* | 10/2019 | Orimo | .................... | H05K 1/181 |
| 2020/0075255 A1* | 3/2020 | Park | ...................... | H01G 4/2325 |
| 2020/0168396 A1 | 5/2020 | Nakamoto | | |
| 2021/0027945 A1* | 1/2021 | Takahashi | ............ | H01G 4/2325 |

\* cited by examiner

MULTI-LAYER CERAMIC ELECTRONIC COMPONENT

CROSS-REFERENCE TO RELATED APPLICATION

This application claims benefit of priority to Korean Patent Application No. 10-2020-0189098 filed on Dec. 31, 2020 in the Korean Intellectual Property Office, the disclosure of which is incorporated herein by reference in its entirety.

TECHNICAL FIELD

The present disclosure relates to a multilayer ceramic electronic component.

BACKGROUND

As an application region of electronic products has expanded, a technical field in which multilayer ceramic electronic components are also used is expanding. In particular, a structure in which an electronic control unit (ECU) or a transmission control unit (TCU) of a vehicle is disposed in an engine bay or is directly attached to a transmission is used according to electronicization of a vehicle.

At the same time, the use of Pb-free solder is increasing to prevent environmental pollution. However, a general lead-free solder has a high melting point and requires a high-temperature heat treatment for a long time. However, when a heat treatment is performed on a conventional multilayer ceramic electronic component at a high-temperature for an extended period of time, lifting of a plating layer may occur. Even if no defects appear on an exterior thereof, when exposed to harsh environments such as high temperature and high vibration environments, expansion and contraction due to high/low-temperature cycles are repeated, resulting in continuous mechanical stress. In addition, continuous application of mechanical stress is a major cause of cracks occurring in terminal electrodes or solders.

SUMMARY

An aspect of the present disclosure is to provide a multilayer ceramic electronic component having fewer defects.

An aspect of the present disclosure is to provide a multilayer ceramic electronic component having an external electrode with improved strength.

According to one of the various objects of the present disclosure, lifting of a plating layer of the multilayer ceramic electronic component may be prevented.

According to an aspect of the present disclosure, a multilayer ceramic electronic component includes: a ceramic body including a dielectric layer, and first and second internal electrodes disposed to be alternately stacked with the dielectric layer interposed therebetween; a first external electrode connected to the first internal electrode of the ceramic body; and a second external electrode connected to the second internal electrode. The first external electrode includes a first electrode layer, disposed to be in contact with the ceramic body, and a first conductive layer disposed on the first electrode layer. The second external electrode includes a second electrode layer disposed to be in contact with the ceramic body, and a second conductive layer disposed on the second electrode layer. The first conductive layer and the second conductive layer may be porous.

According to another embodiment of the present disclosure, a multilayer ceramic electronic component includes: a ceramic body including a dielectric layer, and first and second internal electrodes alternately stacked with the dielectric layer interposed therebetween; a first external electrode connected to the first internal electrode of the ceramic body; and a second external electrode connected to the second internal electrode. The first external electrode includes a first electrode layer disposed to be in contact with the ceramic body, and a first conductive layer disposed on the first electrode layer, and a first metal layer disposed on the first conductive layer. The second external electrode includes a second electrode layer disposed to be in contact with the ceramic body, and a second conductive layer disposed on the second electrode layer, and a second metal layer disposed on the second conductive layer. Average roughness of surfaces of the first metal layer or the second metal layer may be 0.1 µm or more and 10 µm or less.

According to another embodiment of the present disclosure, a multilayer ceramic electronic component includes: a ceramic body including a dielectric layer and first and second internal electrodes disposed to be alternately stacked with the dielectric layer interposed therebetween; a first external electrode connected to the first internal electrode of the ceramic body; and a second external electrode connected to the second internal electrode. The first external electrode comprises an electrode layer disposed on the ceramic body, a first plating layer disposed on the electrode layer, and a second plating layer disposed on the first plating layer. The second plating layer may be also disposed in a pore in the first plating layer.

to another embodiment of the present disclosure, a multilayer ceramic electronic component includes: a ceramic body including a dielectric layer and first and second internal electrodes disposed to be alternately stacked with the dielectric layer interposed therebetween; a first external electrode connected to the first internal electrode of the ceramic body; and a second external electrode connected to the second internal electrode. The first external electrode comprises an electrode layer disposed on the ceramic body, a nickel (Ni) layer disposed on the electrode layer, and a palladium (Pd) disposed on the nickel (Ni) layer. A coverage of the nickel (Ni) layer for the electrode layer may exceed 80% and be less than 100%.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described in detail with reference to the accompanying drawings. The present disclosure may, however, be exemplified in many different forms and should not be construed as being limited to the specific embodiments set forth herein, but should be understood to include various modifications, equivalents, and/or alternatives to the embodiments of the present disclosure. In relation to the description of the drawings, similar reference numerals may be used for similar components.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals.

In the present specification, expressions such as "having", "may have", "comprises", or "may contain" may include a presence of a corresponding feature (e.g., components such as numerical, functions, operations, components, or the like), and a presence of additional feature does not be excluded.

In the present specification, expressions such as "A or B", "at least one of A or/and B", "one or more of A or/and B", or the like may include all possible combinations items listed together. For example, "A or B", "at least one of A and B", or "at least one of A or B" may refer to include cases of (1) at least one A, (2) at least one B, or (3) both including at least one A and at least one B.

In the drawings, an X direction may be defined as a first direction, and an L direction or a length direction, a Y direction may be defined as a second direction, and a W direction or a width direction, and a Z direction may be defined as a third direction, and a T direction or a thickness direction.

Hereinafter, a multilayer ceramic electronic component according to an embodiment of the present disclosure will be described in detail, with reference to FIGS. 1 to 5.

Figure 1:
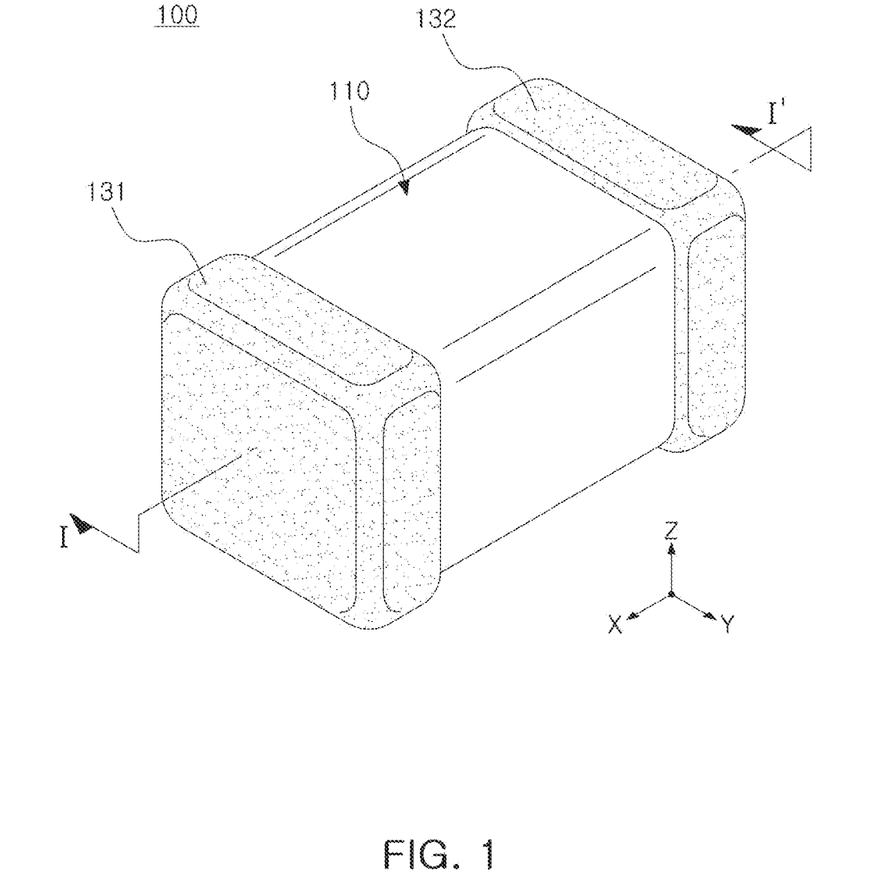
FIG. 1 is a perspective view schematically illustrating a multilayer ceramic electronic component according to an embodiment of the present disclosure.
Figure 2:
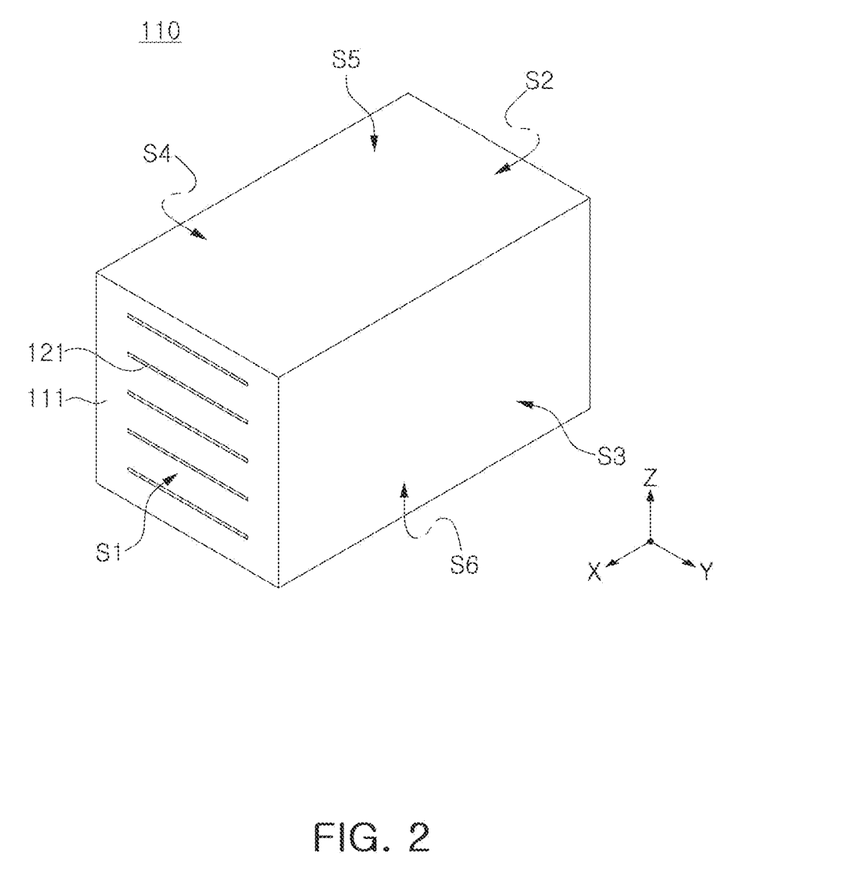
FIG. 2 is a perspective view schematically illustrating the ceramic body of FIG. 1.
Figure 3:
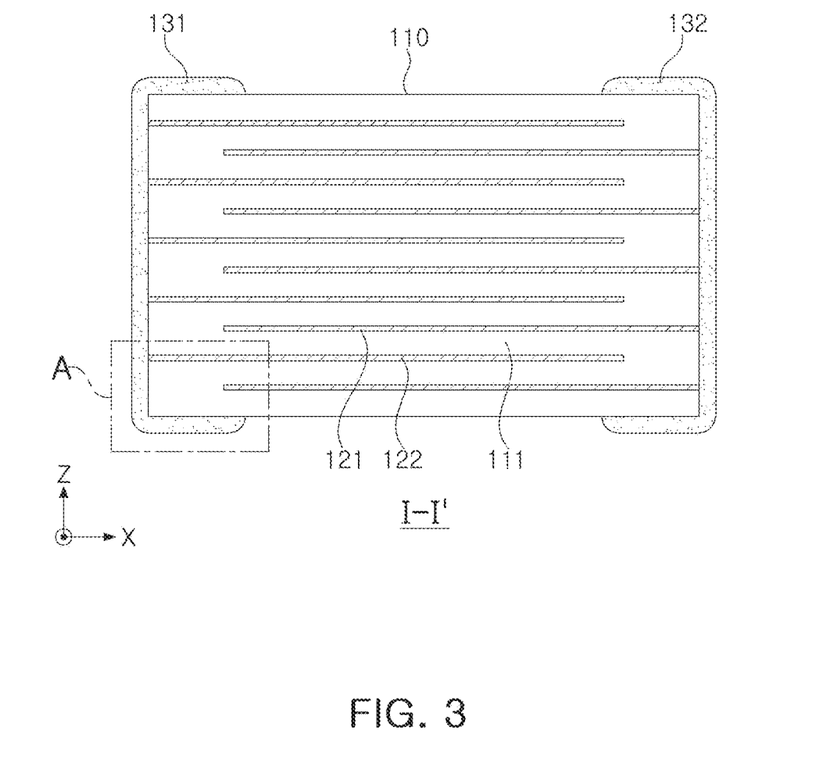
FIG. 3 is a cross-sectional view taken along line I-I' of FIG. 1.
Figure 4:
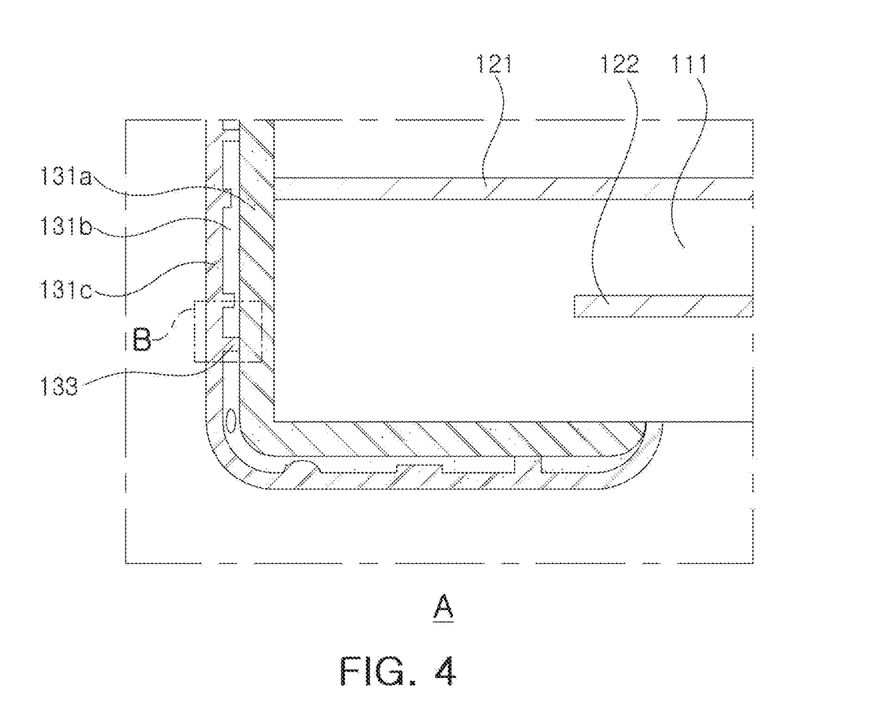
FIG. 4 is an enlarged view of area A of FIG. 3.
Figure 5:
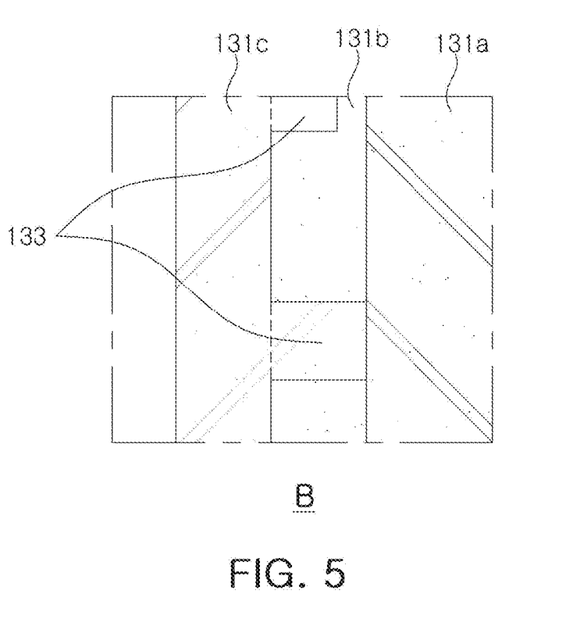
FIG. 5 is an enlarged view of area B of FIG. 4.

FIG. 1 is a perspective view schematically illustrating a multilayer ceramic electronic component 100 according to an embodiment of the present disclosure, FIG. 2 is a perspective view schematically illustrating the ceramic body 110 of FIG. 1, FIG. 3 is a cross-sectional view taken along line I-I' of FIG. 1, and FIG. 4 is an enlarged view of area A of FIG. 3, and FIG. 5 is an enlarged view of area B of FIG. 4.

A multilayer ceramic electronic component 100 according to an embodiment of the present disclosure may include a ceramic body 110 including a dielectric layer 111 and first and second internal electrodes 121 and 122 disposed to be alternately stacked with the dielectric layer 111 interposed therebetween; a first external electrode 131 connected to the first internal electrode 121; and a second external electrode 132 connected to the second internal electrode 122. The first external electrode 131 may include a first electrode layer 131a disposed to be in contact with the ceramic body 110 and a first conductive layer 131b disposed on the first electrode layer 131a. In addition, the second external electrode 132 may include a second electrode layer 132a disposed to be in contact with the ceramic body 110 and a second conductive layer 132b disposed on the second electrode layer 132a.

In this case, the first conductive layer 131b and the second conductive layer 132b may be porous and may include pores 133. In the present specification, that a member is "porous" may mean inclusion of a plurality of recesses, pores, and/or voids on a surface of the member. A portion of the plurality of recesses, pores, and/or voids may be formed only on the surface of the member, and a portion thereof may penetrate through the member. The shape of the recesses, pores and/or voids is not particularly limited, and may also have an irregular shape.

When the first conductive layer 131b and the second conductive layer 132b of the multilayer ceramic electronic component 100 of the present embodiment are porous, respectively, mechanical strength of the first and second external electrodes 131 and 132 may be improved using an anchoring effect between each layer of the first and second external electrodes to be described later.

A multilayer ceramic electronic component 100 according to another embodiment of the present disclosure may include a ceramic body 110 including a dielectric layer 111, and first and second internal electrodes 121 and 122 disposed to be alternately stacked with the dielectric layer 111 interposed therebetween; a first external electrode 131 connected to the first internal electrode 121; and a second external electrode 132 connected to the second internal electrode 122. The first external electrode 131 may include a first electrode layer 131a disposed to be in contact with the ceramic body 110, a first conductive layer 131b disposed on the first electrode layer 131a, and a first metal layer 131c disposed on the first conductive layer 131b. In addition, the second external electrode 132 may include a second electrode layer 132a disposed to be in contact with the ceramic body 110, a second conductive layer 132b disposed on the second electrode layer 132a, and a second metal layer 132c disposed on the second conductive layer 132b.

In this case, average surface roughnesses of the first metal layer 131c and the second metal layer 132c may be 0.1 μm or more and 10 μm or less. In the present specification, the "average surface roughness" of a surface may mean center line average roughness (Ra), and may be a value measured using an optical surface profiler such as a 7300 Optical Surface Profiler from Zygo Corporation, or using a surface roughness measuring device such as SV-3200, or the like from Mitutoyo Corporation. The average surface roughness may be an arithmetic average of a value measured in the Y-axis direction with respect to the X-Y cut plane passing through the center of the surface.

When the first metal layer 131c and the second metal layer 132c of the multilayer ceramic electronic component 100 of the present embodiment satisfy the range of the average surface roughness, as described below, a contact area between respective layers of the first and second external electrodes 131 and 132 may be increased, and the mechanical strength of the first and second external electrodes 131 and 132 may be improved using an anchoring effect.

The multilayer ceramic electronic component 100 according to the present disclosure may include a ceramic body 110 including a dielectric layer 111 and first and second internal electrodes 121 and 122 alternately stacked with the dielectric layer 111 interposed therebetween.

The ceramic body 110 may include first and second surfaces S1 and S2 opposing in a first direction (X direction), third and fourth surfaces S3 and S4 opposing in a second direction (Y direction), and fifth and sixth surfaces S5 and S6 opposing in a third direction (Z direction).

There is no particular limitation on the specific shape of the ceramic body 110, but as shown, the ceramic body 110 may have a hexahedral or a similar shape. Due to shrinkage of the ceramic powder included in the ceramic body 110 during a sintering process, the ceramic body 110 may have a substantially hexahedral shape although not a hexahedral shape having a complete straight line. If necessary, the ceramic body 110 may be rounding processed so that corners are not angled. The rounding process may use, for example, barrel polishing, but is not limited thereto.

In the ceramic body 110, a dielectric layer 111, a first internal electrode 121, and a second internal electrode 122 may be alternately stacked. The dielectric layer 111, the first internal electrode 121, and the second internal electrode 122 may be stacked in a third direction (Z direction). The plurality of dielectric layers 111 are in a sintered state, a boundary between the adjacent dielectric layers 111 may be integrated to such an extent that it is difficult to determine without using a scanning electron microscope (SEM).

According to an embodiment of the present disclosure, the dielectric layer 111 may include a component, represented by $(Ba_{1-x}Ca_x)(Ti_{1-y}(Zr, Sn, Hf)_y)O_3$ (where, $0 \le x \le 1$, $0 \le y \le 0.5$). The component may be, for example, a chemical in which Ca, Zr, Sn and/or Hf is partially dissolved in $BaTiO_3$. In the above compositional formula, x may be in a range of 0 or more and 1 or less, and y may be in a range of 0 or more and 0.5 or less, but is not limited thereto. For example, in the above composition formula, when x is 0, y is 0, and z is 0, the component may be $BaTiO_3$. In addition, various ceramic additives, organic solvents, plasticizers, binders, dispersants, or the like may be added to the above components according to the purpose of the present disclosure.

The dielectric layer 111 may be formed by adding an additive to a slurry containing the above-described material, and applying and drying the same on a carrier film to prepare a plurality of ceramic sheets. The ceramic sheet may be formed by manufacturing the slurry in a sheet shape having a thickness of several μms by a doctor blade method, but is not limited thereto.

The ceramic body 110 may be formed by alternately stacking a ceramic green sheet on which a first internal electrode 121 is printed and a ceramic green sheet on which a second internal electrode 122 is printed on the dielectric layer 111 in a third direction (Z direction). A printing method of the first and second internal electrodes 121 and 122 may be a screen-printing method or a gravure printing method, but is not limited thereto.

The first and second internal electrodes 121 and 122 may be stacked so that respective cross-sections thereof are exposed to both opposite end portions of the ceramic body 110, respectively. Specifically, the first and second internal electrodes 121 and 122 may be exposed to both surfaces of the ceramic body 110 in the first direction (X direction), respectively, and the first internal electrode 121 may be exposed in the direction of the first surface S1 of the ceramic body 110 and the second internal electrode 122 may be exposed in the direction of the second surface S2.

The first and second internal electrodes 121 and 122 may include a conductive metal. The conductive metal may include one or more, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb), and alloy thereof. The first and second internal electrodes 121 and 122 may be formed using a conductive paste containing the conductive metal.

In the multilayer ceramic electronic component according to the present disclosure, a first external electrode 131 and a second external electrode 132 may be disposed on an outer surface of the ceramic body 110. The first external electrode 131 may be disposed on the first surface S1 of the ceramic body 110 of the multilayer ceramic electronic component 100 according to the present disclosure, and the second external electrode 132 may be disposed on the second surface S2 of the ceramic body 120.

The first external electrode 131 may include a first electrode layer 131a and a first conductive layer 131b, and the second external electrode 132 may include a second electrode layer 132a and a second conductive layer 132b. The first electrode layer 131a may be connected to the first internal electrode 121, and the second electrode layer 132b may be connected to the second internal electrode 122. In addition, the first conductive layer 131b may be disposed on the first electrode layer 131a, and the second conductive layer 132b may be disposed on the second electrode layer 132a.

In an embodiment of the present disclosure, the first and second electrode layers 131a and 132a of the multilayer ceramic electronic component 100 according to the present disclosure may include a conductivity imparting agent and a base resin. That is, the first and second electrode layers 131a and 132a of the present embodiment may be resin-based electrodes. The resin-based electrodes may have a structure in which a conductivity imparting agent is dispersed in the base resin, and may be manufactured in an environment, at a lower temperature than sintered electrodes, so that the conductivity imparting agent may exist in a form of particles inside the base resin. In addition, when the first and second electrode layers 131a and 132a are resin-based electrodes, physical stress such as an external impact, or the like, may be blocked.

The conductivity imparting agent may include a conductive metal and/or a conductive polymer. The third conductive metal may be one or more selected from a group consisting, for example, calcium (Ca), titanium (Ti), molybdenum (Mo), tungsten (W), iron (Fe), cobalt (Co), nickel (Ni), palladium (Pd), platinum (Pt), copper (Cu), silver (Ag), gold (Au), zinc (Zn), aluminum (Al), tin (Sn), lead (Pb), and alloys thereof, but is not limited thereto.

In addition, as a non-limiting example of the conductive polymer, the conductive polymer may include sulfur (S) and/or nitrogen (N)-containing compounds such as PT(poly(thiophene)), PEDOT(poly(ethylenedioxy)thiophene), PPS (poly(p-phenylene sulfide)), PANI(polyanilines), P3HT (poly(3-hexylthiophene-2,5-diyl)), PolyTPD(poly(4-butylphenyldiphenylamine)), PSS(poly(4-butylphenyldiphenylamine)), PVK(poly(9-vinylcarbazole)), PDBT(poly(4,4'-dimethoxy bithophene)), polyaniline, or polypyrrole, and compounds not including a hetero atom such as poly(fluorine), polyphenylene, polypyrene, polyazulene, polynaphthalene, PAC(poly(acetylene)), PPV(poly (p-phenylene vinylene), but is not limited thereto.

The first and second electrode layers 131a and 132a may include a conductive filler including a carbon filler such as carbon nanotubes, graphene, fullerene, or the like, and/or a spherical, elliptical, flake, fibrous, or dendrite type alloy filler as necessary, but is not limited thereto.

The base resin included in the first and second electrode layers 131a and 132a may be, for example, a thermosetting resin. Specific examples of the thermosetting resin may include a phenol resin, a urea resin, a diallylphthalate resin, a melanin resin, a guanamine resin, an unsaturated a polyester resin, a polyurethane resin, an epoxy resin, an aminoalkyd resin, a melamine-urea cocondensation resin, a silicon resin, a polysiloxane resin, and the like, but are not limited thereto. When a thermosetting resin is used, a crosslinking agent, a curing agent such as a polymerization initiator, a polymerization accelerator, a solvent, a viscosity modifier, and the like may be further added and used as necessary.

In one example, a first conductive layer 131 and a second conductive layer 132b respectively disposed on the first electrode layer 131a and the second electrode layer 132b of the multilayer ceramic electronic component 100 of the present I disclosure may be plating layer. The first and second conductive layers may contain nickel (Ni) in the greatest amount, and may include one or more selected from a group consisting of copper (Cu), tin (Sn), palladium (Pd), platinum (Pt), gold (Au), silver (Ag), tungsten (W), titanium (Ti), lead (Pb), and alloys thereof, but is not limited thereto. The plating layer may be formed of a single layer or a plurality of layers, and may be formed by sputtering or electrolytic plating, nut is not limited thereto.

In one example, a first conductive layer 131b and a second conductive layer 132b of the multilayer ceramic electronic component 100 of the present disclosure may be porous. As described above, the first conductive layer 131b and the second conductive layer 132b may include a plurality of recesses, pores, and/or voids. The plurality of recesses, pores, and/or voids may be disposed on the first conductive layer 131b and the second conductive layer 132b, so that mechanical strength of the first and second external electrodes 131 and 132 may be improved using an anchoring effect of the first conductive layer 131b and the second conductive layer 132b.

In another example, average surface roughness of the first conductive layer 131b and the second conductive layer 132b of the multilayer ceramic electronic component 100 according to the present disclosure may be 0.1 µm or more and 10 µm or less. The average surface roughness of the first conductive layer 131b and the second conductive layer 132b may be a value measured by the above-described method. When the average surface roughness of the first and second conductive layers 131b and 132b satisfies the above range, the surface areas of the first and second conductive layers 131b and 132b may be maximized, such that external electrode having excellent bonding strength can be formed.

If the first conductive layer 131b and the second conductive layer 132b of the multilayer ceramic electronic component 100 according to the present disclosure have the above-described porosity and/or roughness, a method of forming the same is not particularly limited. For example, when the first electrode layer 131a and the second electrode layer 132a are resin-based electrodes, unlike forming a plating layer on a surface of metal, the plating layer is grown around the exposed portion of the conductive imparting agent used as a plating seed. By using this, the above-described porous surface and/or a surface having roughness may be formed by controlling plating time and plating conditions when forming the first conductive layer 131b and the second conductive layer 132b, but it is not limited to the method.

In one example of the present disclosure, a coverage of the first conductive layer for the first electrode layer 131a of the multilayer ceramic electronic component 100 may exceed 80%. In addition, a coverage of the second conductive layer 132b for the second electrode layer 132a of the multilayer ceramic electronic component 100 may exceed 80%. In the present specification, the term "coverage" may mean a ratio of an area in which the electrode layer is covered by the conductive layer on a surface of a metal layer, and may mean a ratio of an area of the conductive layer disposed on the surface of the electrode layer for the area of the electrode layer. The coverage may mean a value obtained by being calculated using an image analysis program (Image Pro plus ver 4.5 from Mediacybernetics) after taking an image with a scanning electron microscope (SEM, JSM-7400F from Jeol Corporations) with respect to a X-Y cross-sectional surface passing through a center of the multilayer ceramic electronic component. The coverage may exceed 80%, be 82% or more, be 84% or more, be 86% or more, be 88% or more, be 90% or more, or be 93% or more. In addition, an upper limit of the coverage requires an existence of a region in which the first and second conductive layers 131b and 132b do not cover the first and second electrode layers 131a and 132a, and may be for example, less than 100%. When the coverage range described above is satisfied, each interlayer bonding property of the external electrode can be improved.

In an embodiment of the present disclosure, the first external electrode 131 of the multilayer ceramic electronic component 100 may include a first metal layer 131c disposed on the first conductive layer 131b, and the second external electrode 132 may include a second metal layer 132c disposed on the second conductive layer 132b.

In an example of the present disclosure, first and second metal layers 131c and 132c respectively disposed on the first conductive layers 131b and 132b of the multilayer ceramic component 100 may be plating layers. The first metal layer 131c may be disposed to cover the first conductive layer 131b, and the second metal layer 132c may be disposed to cover the second conductive layer 132b. The first and second metal layers 131c and 132c may contain palladium (Pd) in the greatest amount, and may include one or more selected from a group consisting of copper (Cu), nickel (Ni), tin (Sn), platinum (Pt), gold (Au), Silver (Ag), tungsten (W), titanium (Ti), lead (Pb) and alloys thereof, but is not limited thereto.

In one example, average surface roughness of the first metal layer 131c and the second metal layer 132c of the multilayer ceramic electronic component 100 according to the present disclosure may be 0.1 µm or more and 10 µm or less. The average surface roughness of the first metal layer 131c and the second metal layer 132c may be a value measured by the above-described method. As described above, the first and second conductive layers 131b and 132b are formed with predetermined roughness. When the first and second metal layers 131c and 132c are formed on the first and second conductive layers 131b and 132b by plating, since the first and second conductive layers 131b and 132b have overall conductivity as a plating layer, the first and second metal layers 131c and 132c are evenly formed on the first and second conductive layers 131b and 132b, surfaces of the first and second metal layers 131c and 132c may also have the predetermined roughness due to the surfaces of the first and second conductive layers 131b and 132b having a predetermined range of roughness. When the average surface roughness of the first metal layer 131c and the second metal layer 132c satisfies the above range, surface areas of the first metal layer 131c and the second metal layer 132c may be maximized, such that external electrodes having excellent bonding strength may be formed.

In an embodiment of the present disclosure, the first and second metal layers 131c and 132c of the multilayer ceramic electronic component 100 of the present disclosure may be disposed to cover the first and second conductive layers 131b and 132b, respectively. In this specification, disposing a layer to "cover" another layer may refer to a structure in which a layer located on an inner side is not exposed to the outside and may refer to a structure in which a layer is disposed on the inner side of a layer disposed on an outer side and here only the layer disposed on the outer side is visible from the outside. As described above, when the first and second metal layers 131c and 132c are disposed to cover the first and second conductive layers 131b and 132b, respectively, the first and second metal layers 131c and 132c may serve to prevent the first and second conductive layers 131b and 132b from being exposed externally, thereby blocking external pollutants or moisture.

In one example, at least a portion of the first external electrode 131 of the multilayer ceramic electronic component 100 may be disposed to extend onto the third surface S3, the fourth surface S4, the fifth surface S5, and the sixth surface S6. In addition, at least a portion of the second external electrode 132 may be disposed to extend onto the third surface S3, the fourth surface S4, the fifth surface S5, and the sixth surface S6. In this case, the first external electrode 131 and the second external electrode 132 may be disposed to be spaced apart from each other. When at least a portion of the first external electrode 131 and/or the second external electrode 132 is disposed to extend onto the third surface S3, the fourth surface S4, the fifth surface S5, and the sixth surface S6 of the ceramic body 110, respectively, the extended portion may function as a so-called band portion, and function to improve the mounting strength of the multilayer ceramic electronic component 100 and prevent moisture penetration according to the present disclosure.

Experimental Example

A test for bonding properties of external electrodes was conducted using a mass-produced chip (temperature characteristics of X7R and a capacity of 220.0 nF) having a 1005 size (length×width×thickness: 1.0 mm×0.5 mm×0.5 mm) from Samsung Electro-Mechanics having external electrodes formed on a surface of the ceramic body in a length direction.

First and second electrode layers were formed on a ceramic body in which first and second internal electrodes were alternately disposed therein. The first and second electrode layers were formed of a conductive resin containing epoxy and copper.

First and second conductive layers are formed by plating nickel (Ni) on the first and second electrode layers, respectively, and first and second metal layers were formed by plating palladium (Pd) on the first and second conductive layers to manufacture a proto-type multilayer ceramic electronic component.

Table 1 below illustrates bonding properties of the proto-type multilayer ceramic electronic component in which a coverage of a plating layer is changed by controlling a plating time under the same applied current for the same proto-type multilayer ceramic electronic component.

The bonding properties was carried out using an adhesive tape having peeling force of 30 gf/25 mm measured at a rate of 300 mm/min and a 90° angle at 25° C. to a glass substrate. The adhesive tape was attached to the surface of the multilayer ceramic electronic component, and after 1 minute elapsed, it was separated by applying force at a 90° angle. A case, in which the plating layer is peeled off or lifting of the plating layer occurs, after the separation was evaluated as NG, and a case, in which lifting or a peeling-off phenomenon of the plating is not occurred, was evaluated as OK.

TABLE 1

| Applied current (mA) | Plating time | Plating coverage | Palladium bonding property |
|---|---|---|---|
| 99 | 15 min. | 43% | NG |
| | 30 min. | 80% | NG |
| | 45 min. | 93% | OK |
| | 50 min. | 96% | OK |
| | 60 min. | 100% | NG |

Figure 6A:
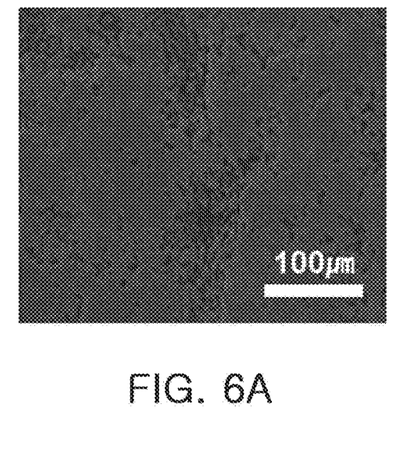
FIGS. 6A and 6B respectively show an SEM image of a cross-section of an external electrode according to an embodiment of the present disclosure.
Figure 6B:
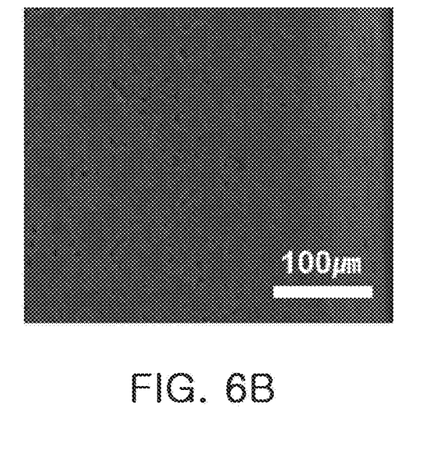

Referring to Table 1, it can be seen that even when a palladium (Pd) plating layer has a coverage of 80% for the first and second metal layers, lifting of the palladium plating layer may occur, but when the palladium (Pd) plating layer has a coverage of 93%, lifting of the plating layer may not occur. In addition, it can be confirmed that defects of the plating layer occur even when the plating layer is formed over the entire area. Further, FIG. 6A shows an SEM image of a cross-section of an external electrode when Ni was plated for 45 minutes according to an embodiment of the present disclosure, and FIG. 6B shows an SEM image of a cross-section of an external electrode when Ni was plated for 50 minutes according to an embodiment of the present disclosure. Therefore, it can be seen that a palladium plating layer having excellent bonding properties can be implemented in a range in which the coverage of the first and second conductive layers for the first and second metal layers exceeds 80% and is less than 100%.

As set forth above, according to one of the various effects of the present disclosure, an occurrence of defects of the multilayer ceramic electronic components may be reduced.

According to one of the various effects of the present disclosure, a strength of external electrodes of the multilayer ceramic electronic component may be improved.

According to one of the various effects of the present disclosure, a multilayer ceramic electronic component capable of preventing lifting of a plating layer may be provided.

However, various and advantageous advantages and effects of the present disclosure are not limited to the above description, and will be more readily understood in the process of describing specific embodiments of the present disclosure.

While example embodiments have been shown and described above, it will be apparent to those skilled in the art that modifications and variations could be made without departing from the scope of the present disclosure as defined by the appended claims.

What is claimed is:

1. A multilayer ceramic electronic component, comprising:
a ceramic body including a dielectric layer and first and second internal electrodes disposed to be alternately stacked with the dielectric layer interposed therebetween;
a first external electrode connected to the first internal electrode of the ceramic body; and
a second external electrode connected to the second internal electrode,
wherein the first external electrode comprises a first electrode layer disposed to be in contact with the ceramic body, a first conductive layer disposed on the first electrode layer, and a first metal layer disposed on the first conductive layer and in contact with the first electrode layer,
wherein the second external electrode comprises a second electrode layer disposed to be in contact with the ceramic body, a second conductive layer disposed on the second electrode layer, and a second metal layer disposed on the second conductive layer and in contact with the second electrode layer,
wherein the first conductive layer and the second conductive layer are plating layers, and
wherein at least one of the first conductive layer or the second conductive layer includes a non-corner/non-edge portion which is porous.

2. The multilayer ceramic electronic component of claim 1, wherein a coverage of the first conductive layer for the first electrode layer and/or a coverage of the second conductive layer for the second electrode layer exceeds 80%.

3. The multilayer ceramic electronic component of claim 1, wherein average surface roughness (Ra) of the first conductive layer or the second conductive layer is 1.0 μm or more.

4. The multilayer ceramic electronic component of claim 1, wherein the first and second metal layers are plating layers.

5. The multilayer ceramic electronic component of claim 1, wherein the first metal layer is disposed to cover the first conductive layer,
wherein the second metal layer is disposed to cover the second conductive layer.

6. The multilayer ceramic electronic component of claim 1, wherein the first and second electrode layers comprise resin electrodes containing a conductivity imparting agent and a base resin.

7. The multilayer ceramic electronic component of claim 1, wherein the first and second conductive layers include nickel (Ni).

8. The multilayer ceramic electronic component of claim 1, wherein the ceramic body includes first and second surfaces opposing each other in a first direction of the ceramic body, third and fourth surfaces opposing each other in a second direction of the ceramic body, and fifth and sixth surfaces opposing each other in a third direction of the ceramic body,
wherein the first external electrode is disposed on the first surface of the ceramic body,
wherein the second external electrode is disposed on the second surface of the ceramic body,
wherein at least a portion of the first external electrode is disposed to extend onto the third, fourth, fifth and sixth surfaces of the ceramic body,
wherein at least a portion of the second external electrode is disposed to extend onto the third, fourth, fifth and sixth surfaces of the ceramic body.

9. A multilayer ceramic electronic component, comprising:
a ceramic body including a dielectric layer and first and second internal electrodes disposed to be alternately stacked with the dielectric layer interposed therebetween;
a first external electrode connected to the first internal electrode of the ceramic body; and
a second external electrode connected to the second internal electrode,
wherein the first external electrode comprises a first electrode layer disposed to be in contact with the ceramic body, a first conductive layer disposed on the first electrode layer, and a first metal layer disposed on the first conductive layer and in contact with the first electrode layer,
wherein the second external electrode comprises a second electrode layer disposed to be in contact with the ceramic body, a second conductive layer disposed on the second electrode layer, and a second metal layer disposed on the second conductive layer and in contact with the second electrode layer,
wherein average roughness of a surface of the first metal layer or the second metal layer is 0.1 μm or more and 10 μm or less, and
wherein at least one of the first conductive layer or the second conductive layer includes a non-corner/non-edge portion which is porous.

10. The multilayer ceramic electronic component of claim 9, wherein average surface roughness (Ra) of the first and second conductive layers is 1.0 μm or more.

11. The multilayer ceramic electronic component of claim 9, wherein a coverage of the first conductive layer for the first electrode layer and/or a coverage of the second conductive layer for the second electrode layer exceeds 80%.

12. The multilayer ceramic electronic component of claim 9, wherein the first and second electrode layers comprise resin electrodes containing a conductivity imparting agent and a base resin.

13. The multilayer ceramic electronic component of claim 9, wherein the first conductive layer and the second conductive layer are plating layers.

14. The multilayer ceramic electronic component of claim 9, wherein the first and second conductive layers include nickel (Ni).

15. The multilayer ceramic electronic component of claim 9, wherein the first and second metal layers are plating layers.

16. The multilayer ceramic electronic component of claim 15, wherein the first and second metal layers include palladium (Pd).

17. The multilayer ceramic electronic component of claim 9, wherein the ceramic body includes first and second surfaces opposing each other in a first direction of the ceramic body, third and fourth surfaces opposing each other in a second direction of the ceramic body, and fifth and sixth surfaces opposing each other in a third direction of the ceramic body,
wherein the first external electrode is disposed on the first surface of the ceramic body,
wherein the second external electrode is disposed on the second surface of the ceramic body,
wherein at least a portion of the first external electrode is disposed to extend onto the third, fourth, fifth and sixth surfaces of the ceramic body,
wherein at least a portion of the second external electrode is disposed to extend onto the third, fourth, fifth and sixth surfaces of the ceramic body.

18. The multilayer ceramic electronic component of claim 9, wherein the first metal layer is disposed to cover the first conductive layer,
wherein the second metal layer is disposed to cover the second conductive layer.

19. A multilayer ceramic electronic component, comprising:
a ceramic body including a dielectric layer and first and second internal electrodes disposed to be alternately stacked with the dielectric layer interposed therebetween;
a first external electrode connected to the first internal electrode of the ceramic body; and
a second external electrode connected to the second internal electrode,
wherein the first external electrode comprises an electrode layer disposed on the ceramic body, a first plating layer disposed on the electrode layer, and a second plating layer disposed on the first plating layer and in contact with the electrode layer,
wherein the second plating layer is also disposed in a pore in the first plating layer, and
wherein the pore is arranged in a non-corner/non-edge portion of the first plating layer.

20. The multilayer ceramic electronic component of claim 19, wherein the pore is spaced apart from the electrode layer.

21. The multilayer ceramic electronic component of claim 19, wherein the pore penetrates through the first plating layer.

22. The multilayer ceramic electronic component of claim 21, wherein the second plating layer is in contact with the electrode layer through the pore.

23. The multilayer ceramic electronic component of claim 19, wherein the electrode layer includes copper (Cu),
wherein the first plating layer includes nickel (Ni),
wherein the second plating layer includes palladium (Pd).

24. A multilayer ceramic electronic component, comprising:
a ceramic body including a dielectric layer and first and second internal electrodes disposed to be alternately stacked with the dielectric layer interposed therebetween;
a first external electrode connected to the first internal electrode of the ceramic body; and
a second external electrode connected to the second internal electrode,
wherein the first external electrode comprises an electrode layer disposed on the ceramic body, a nickel (Ni) layer disposed on the electrode layer, and a palladium (Pd) layer disposed on the nickel (Ni) layer and in contact with the electrode layer,
wherein a coverage of the nickel (Ni) layer for the electrode layer exceeds 80% and is less than 100%, and
wherein the nickel (Ni) layer includes a non-corner/non-edge portion which is porous.

25. The multilayer ceramic electronic component of claim 24, wherein the nickel (Ni) layer is in contact with the palladium (Pd) layer.

26. The multilayer ceramic electronic component of claim 24, wherein the electrode layer comprises a resin electrode containing a conductivity imparting agent and a base resin.

* * * * *